(12) United States Patent
Gladisch et al.

(10) Patent No.: US 11,397,660 B2
(45) Date of Patent: Jul. 26, 2022

(54) METHOD AND APPARATUS FOR TESTING A SYSTEM, FOR SELECTING REAL TESTS, AND FOR TESTING SYSTEMS WITH MACHINE LEARNING COMPONENTS

(71) Applicant: Robert Bosch GmbH, Stuttgart (DE)

(72) Inventors: Christoph Gladisch, Renningen (DE); Thomas Heinz, Stuttgart (DE); Christian Heinzemann, Ludwigsburg (DE); Matthias Woehrle, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 16/878,848

(22) Filed: May 20, 2020

(65) Prior Publication Data
US 2020/0409816 A1   Dec. 31, 2020

(30) Foreign Application Priority Data
Jun. 28, 2019   (DE) .......................... 102019209538.0

(51) Int. Cl.
*G06F 11/34*  (2006.01)
*G06F 11/26*  (2006.01)
*G06F 11/36*  (2006.01)

(52) U.S. Cl.
CPC ........ *G06F 11/3457* (2013.01); *G06F 11/261* (2013.01); *G06F 11/3452* (2013.01); *G06F 11/3672* (2013.01)

(58) Field of Classification Search
None
See application file for complete search history.

(56) References Cited

U.S. PATENT DOCUMENTS

2005/0265490 A1* 12/2005 Sestok ................ H04L 25/0232
                                                    375/340
2020/0156243 A1*  5/2020 Ghare ................. G06F 11/3466

FOREIGN PATENT DOCUMENTS

DE          10303489 A1    8/2004

* cited by examiner

*Primary Examiner* — Craig C Dorais
(74) *Attorney, Agent, or Firm* — Norton Rose Fulbright US LLP; Gerard Messina

(57) ABSTRACT

A method or testing a system. Input parameters of the system are divided into a first group and a second group. Using a first method, a first selection is made from among the input parameter assignments of the first group. Using a second method, a second selection is made from among the input parameter assignments of the second group. A characteristic value is calculated from the second selection. The first selection is adapted depending on the characteristic value.

13 Claims, 2 Drawing Sheets

METHOD AND APPARATUS FOR TESTING A SYSTEM, FOR SELECTING REAL TESTS, AND FOR TESTING SYSTEMS WITH MACHINE LEARNING COMPONENTS

CROSS REFERENCE

The present application claims the benefit under 35 U.S.C. § 119 of German Patent Application No. DE 102019209538.0 filed on Jun. 28, 2019, which is expressly incorporated herein by reference in its entirety.

FIELD

The present invention relates to a method for testing a system. The present invention furthermore relates to a corresponding apparatus, to a corresponding computer program, and to a corresponding storage medium.

BACKGROUND INFORMATION

In software engineering, the use of models in order to automate testing activities and generate test artifacts in the testing process is referred to in general as "model-based testing" (MBT). The generation of test cases from models that describe the intended behavior of the system being tested is, for example, sufficiently known.

Embedded systems, in particular, rely on coherent input signals of sensors, and in turn stimulate their environment by way of output signals to a wide variety of actuators. In the course of verification and preliminary development phases of such a system, a model (model in the loop, MiL), software (software in the loop, SiL), processor (processor in the loop, PiL), or overall hardware (hardware in the loop, HiL) of a control loop is therefore simulated in that loop together with a model of the environment. In automotive engineering, simulators in accordance with this principle for testing electronic control devices are in some cases referred to, depending on the test phase and test object, as component test stands, model test stands, or integration test stands.

German Patent Application No. DE 10303489 A1 describes a method of this kind for testing software of a control unit of a vehicle, of a power tool, or of a robotic system, in which a controlled system controllable by the control unit is at least partly simulated by a test system by the fact that output signals are generated by the control unit and those output signals of the control unit are transferred to first hardware modules via a first connection and signals of second hardware modules are transferred as input signals to the control unit via a second connection, the output signals being furnished as first control values in the software and additionally being transferred via a communication interface to the test system in real time with reference to the controlled system.

Simulations of this kind are common in various technological sectors and are utilized, for example, in order to test embedded systems in power tools, in engine control devices for drive systems, steering systems, and braking systems, in camera systems, in systems having artificial-intelligence and machine-learning components, or in autonomous vehicles, for suitability in their early development phases. The results of simulation models according to the existing art are nevertheless incorporated only to a limited extent in release decisions due to a lack of confidence in their reliability.

SUMMARY

The present invention provides: a method for testing a system; a corresponding apparatus; a corresponding computer program; and a corresponding storage medium.

One advantage of an example embodiment of the present invention lies in the combination according to the present invention of, on the one hand, conventional tests that deal with worst-case behavior and, on the other hand, statistical or probabilistic methods that supply more comprehensive criteria for a system. The method can be used to select tests that are carried out in a physical (real) environment or only virtually (in a simulation). It can furthermore serve to search for critical test scenarios (or other environmental and initial conditions) and to estimate the global performance of autonomous vehicles, to test machine-learned functions and image processing algorithms, and to generate training data for machine learning and computer vision.

The term "verification" will be used hereinafter as a synonym for "testing," and the terms "testing," "search-based testing," and "uncertainty quantification" will be described below.

The approach according to the present invention is based on the recognition that strict tests are necessary in order to ensure the reliability and safety of complex systems such as autonomous vehicles. The system under test (SUT) is operated under specific environmental conditions and with various inputs. The term "inputs" will be used hereinafter both for the direct inputs of the SUT and for the variables that describe the environmental conditions under which the SUT is operated. The SUT can be operated either in a physical configuration (real environment) or in a model of the physical configuration, i.e., in the context of a simulation.

One objective of such tests is to search for an input or an environmental condition (hereinafter referred to collectively as an "input") of the SUT for which the latter does not meet its requirements in terms of a desired behavior, or for which its performance is poor or minimal. If the test does not indicate any such critical inputs or environmental conditions, it is assumed that the SUT is meeting its requirements in terms of the desired behavior, or that its performance in the worst case is known. The possible (in the sense of "valid" or "permissible") input range, and the environmental conditions, can be limited before or after testing, and the end result applies to all inputs.

The example method furthermore arises in the context of search-based testing (SBT), constituting an automatic test-generation method in which optimization techniques are used to select the respective next test input. An existing optimization algorithm, for instance Bayesian optimization, generates inputs for the SUT, with the objective of minimizing the SUT's performance, which is evaluated by a performance monitor.

In contrast to conventional tests, statistical and probabilistic methods such as uncertainty quantification (UQ) do not concentrate only on the performance of the SUT in the worst case, but instead attempt to evaluate the overall performance of the SUT in consideration of the randomness and uncertainty of the inputs, including any environmental conditions. The test inputs of the SUT are ascertained on the basis of a specific probability distribution that can be defined either explicitly, for example based on the mean and standard deviation of a Gaussian process, or implicitly by way of a specific environmental configuration and parameterization thereof. The output is a probability distribution in the form of a histogram that summarizes the performance of the SUT. The probability here is valid only if the explicit or implicit input sample distribution has been correctly selected. By specifying a threshold value for the performance, and by thus defining a requirement, UQ can indicate the probability that the SUT will meet its requirement.

A first challenge here is that the testing of systems in a physical (real) environment is complex. Strict tests in a physical environment can in fact be impossible for reasons of time or safety. Methods for testing systems in a simulated (virtual) environment are therefore considered.

In light of the above, the approach according to the present invention recognizes the impossibility of eliminating all physical tests. At a given time, the simulation environment must itself be validated and calibrated, and the differences and inconsistencies between the physical and virtual environments must be measured and taken into account in the overall approach. The approach facilitates the selection or prioritization of those tests that should be carried out in a real environment, in consideration of the influence of uncertainties with regard to the model parameters. According to the present invention, the selection of those tests that are to be repeated in a real environment is made exclusively using simulations.

Conventional techniques for selecting the real test cases either utilize a predefined sample strategy, or calculate measurement uncertainties. The approach provided by the present invention, conversely, selects test cases based on the behavior of the simulation model in a context of given uncertainties with respect to the model parameters.

The present invention also solves a further problem that is not directly correlated with the difference (described below) between real and virtual tests: In machine learning, the existence of so-called adversarial examples represents a second challenge. An adversarial example is a slight variation of an input which leads to an undesired output. Given two images of an automobile which differ only slightly in terms of a few pixel values and appear to humans to be identical, a neural network, for example, classifies one of the images as an automobile and the other as another type of object.

Current machine learning algorithms are susceptible to adversarial examples, and effective methods for generating them are known. A relevant generator (adversarial example generator, AEG) generates, for an input A for which a given neural network generates the correct output, an input A' for which the same network outputs an incorrect output. In the case of conventional testing whose objective is to find errors, an AEG thus solves the test problem of finding, for a test input A, a "successful test" in the sense of an input A' that is likewise valid but for which the SUT fails. Conventionally, one might therefore come to the conclusion that the SUT is not meeting its requirement and must be corrected, or even that machine learning does not function in principle if errors are not tolerable.

The approach according to the present invention recognizes that this view of conventional testing is too strict for applications that are based on machine learning, since the probability of encountering an error can be very small or insignificant even if one can be constructed using an AEG method. Probabilistic/statistical methods, on the other hand, calculate an "average case behavior" that is not adequate for safety-critical applications.

Example embodiments of the present invention combine analyses of the worst case and the average case in order to arrive at a suitable compromise in that context and to find the most critical test scenarios or test cases. A "test scenario" in this sense represents an (in some cases extremely extensive) test space.

This test space grows exponentially with the number of input parameters of the SUT and its environment. A third challenge involves testing or analyzing systems having such a large number of inputs.

Advantageous refinements of and improvements to the present invention are possible thanks to the features described herein.

BRIEF DESCRIPTION OF THE DRAWINGS

Exemplifying embodiments of the present invention are depicted in the figures and are explained in further detail in the description below.

DETAILED DESCRIPTION OF EXAMPLE EMBODIMENTS

Figure 1:
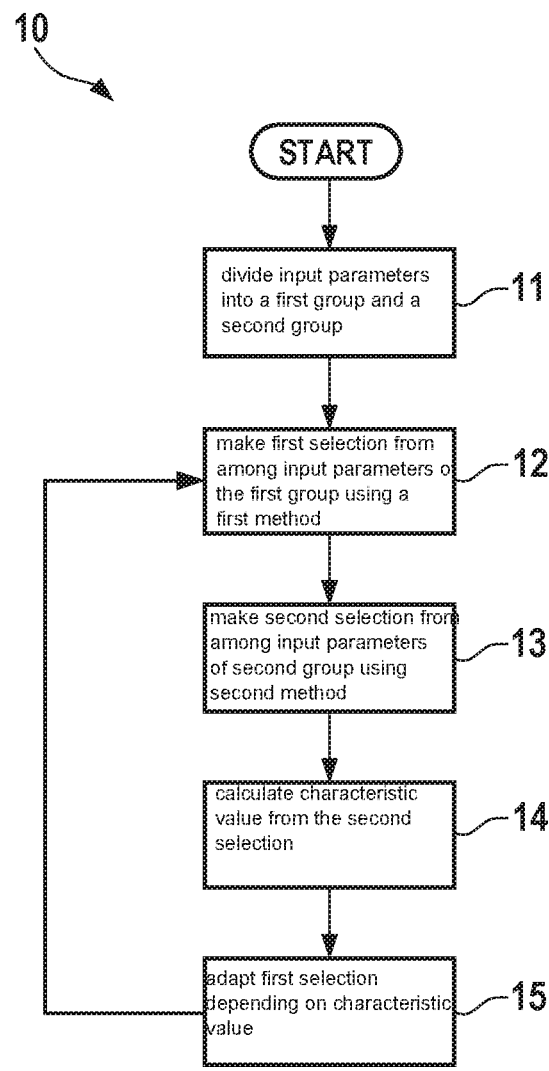
FIG. 1 is a flow chart of a method according to a first embodiment of the present invention.
Figure 2:
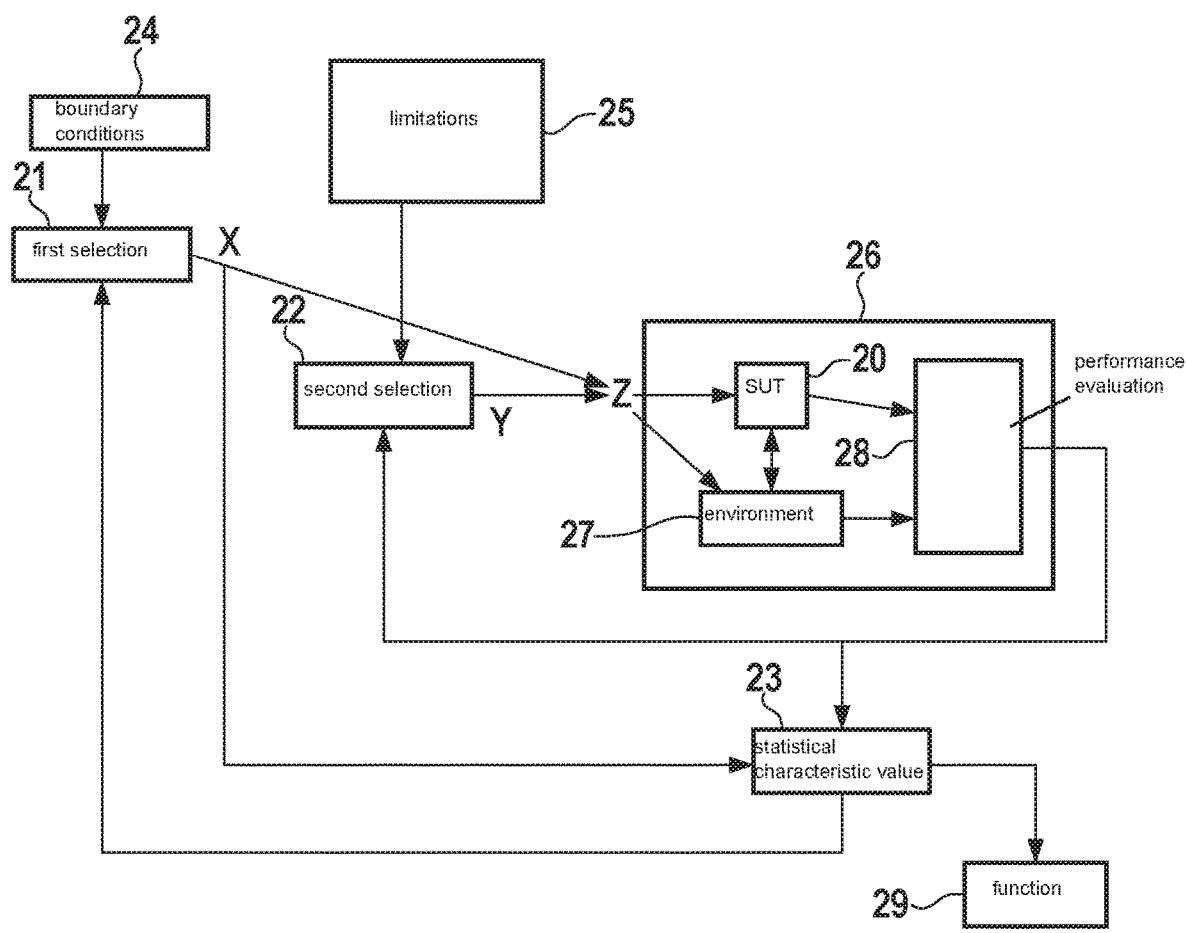
FIG. 2 schematically shows the approach according to the present invention.

FIG. 1 illustrates a method (10) according to the present invention which will now be explained with reference to the block diagram of FIG. 2. The method provides that the set of input parameters Z of the SUT (reference character 20—FIG. 2) and its environment (reference character 27—FIG. 2) are divided into two groups X and Y of parameters (process 11—FIG. 1), and they are then investigated using two methods A and B. Method A is a test method that concentrates on the worst case and that creates a sample (reference character 21—FIG. 2) over the values of X (process 12—FIG. 1); and method B is a probabilistic method that creates a sample (reference character 22—FIG. 2) over the values of Y (process 13—FIG. 1). From this selection (22), a statistical characteristic value (reference character 23—FIG. 2) is calculated (process 14—FIG. 1) and is used in turn to influence the selection of X (process 15—FIG. 1). The probabilistic method B thus calculates, as a result, a mathematical projection of Z onto X which is used by method A.

For this purpose, an the parameters Z are divided into the aforesaid two groups X and Y of parameters, where $X \cup Y = Z$. Typically, but not necessarily, the number of parameters X is less than Y, i.e., $|X| < |Y|$. Parameters X are subject to boundary conditions (reference character 24—FIG. 2), and parameters Y are subject to limitations (reference character 25—FIG. 2), which in turn can contain hard boundary conditions or a distribution that can be predefined explicitly as a probability distribution function (PDF) or implicitly via a sampling method (e.g. environmental conditions).

The example method can be summarized by the following algorithm:

r1=[]
if not A_TestEndX (r1):
x=A_GenTestX (r1,XBoundaryConditions)
r2=[]/empty list
if not B_TestEndY (r2):
y=B_GenSampleY (r2,YLimitations)
r2=r2.append (CompleteSUT(x,y))))
r1=Statistics(r2, x)
endresult=sort(r1)

A candidate for method A (A_TestEndX, A_GenTestX) is the aforementioned search-based testing. A candidate for B (B_TestEndY, B_GenSampleY) is uncertainty quantification that is also described above.

The "CompleteSUT" function (reference character 26—FIG. 2) represents the SUT (20) together with its virtual environment (27), possible interference models, and a function (28) that evaluates its behavior or its outputs, for example in the form of a performance monitor, a test oracle, or simply an output signal selector. With the exception of the SUT (20) itself, however, the sub-components (27, 28) of this simulation (26) are optional.

The "Statistics" function (reference character 23—FIG. 2) is a combination of the results r2 for a fixed x and a variable y; this is to be understood as a projection of y onto the current x. Examples of a suitable characteristic value (23) are a minimum, average, expected value, standard deviation, difference between maximum and minimum, or probability of default. The variable r1 represents a list or other data structure of tuples that link each value x to the corresponding statistical result.

The functions "A_TestEndX" and "B_TestEndY" can be defined, for example, according to the following pseudo-code: "|r1|<MaxSamplesA" and "|r2|<MaxSamplesB". More-complex methods (e.g., coverage-based methods) are also possible.

The statistical evaluations (23) with the associated parameter assignments X are combined in a function (reference character 29) and presented to the user as a result. Manifestations of this function are, for example, a sorting, a selection, or a visualization of the text cases based on the calculated statistics.

The final result is a sorted list of the statistical results, which defines a prioritization of the test scenarios over X.

The algorithm effectively searches for an allocation of X in which variations of Y result in the worst statistical value or in which the statistical sensitivity of the model is greatest. Because X is contained in the complete test space Z, it can be understood as a test scenario having variable parameters Y.

With regard to the first of the challenges outlined above, the parameters X are typically inputs that can be controlled without difficulty in the real test, i.e., so to speak, "free" parameters such as the steering input or acceleration of an automobile. The parameters Y, however, are typically difficult to control—e.g. friction of the wheels, engine temperature, or wind conditions—but it is assumed that they too are considered in the simulation model (26). The output of the algorithm is a prioritization of test scenarios for the real environment which are to be regarded as being presumably the most critical in view of the statistics used.

With regard to the second challenge, consider the utilization case of computer vision using the example of automated driving. The input of a relevant algorithm is typically an image, and its output corresponds to a classification of the objects visible in that image. Consider further here the case in which the input into the algorithm derives from an environment (27) that can either be simulated with the aid of three-dimensional computer graphics or recorded in real life using a camera.

In this case the user selects the parameters X that describe the scenario, e.g., based on traffic circumstances, objects in the image, or time of day. The user further selects the parameters Y that can be varied in each scenario, e.g., camera position and orientation, intrinsic camera parameters, and the position and orientation of objects in the scene. The variations in the parameters Y can be regarded as a calculation of the probability of the occurrence of adversarial examples in a scenario.

The algorithm according to the present invention supplies the scenarios that are most critical for the variations in Y. The safety of various operating sectors of an autonomous vehicle can thereby be determined or evaluated.

With regard to the third challenge, test problems having many (for example, 50) parameters are difficult because of the problem of "state space explosion." The approach described helps solve this problem by subdividing Z in such a way that |X|<<|Y|, e.g. |X|=5 and |Y|=45. The user selects the most important parameters as X, and less important parameters as Y. This approach allows the parameters X and Y to be dealt with using two different sample methods, and projects the results of the Y variation onto the X space. A coarse analysis of the Y space and a detailed analysis of the X space are thus carried out.

Figure 3:
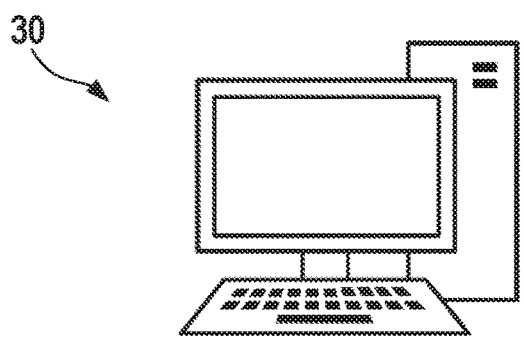
FIG. 3 shows a workstation according to a second embodiment of the present invention.

This method (10) can be implemented, for example, in software or hardware or in a mixed form of software and hardware, for example in a workstation (30) as illustrated by the schematic depiction of FIG. 3.

What is claimed is:

1. A computer-implemented method for testing a system, comprising the following steps:
    dividing input parameters of the system into a first group and a second group;
    selecting, using a first method, a first selection from among the input parameters assigned to the first group, wherein the first method includes search-based testing in which an optimization technique is used to select the first selection in which an objective of the optimization technique is to minimize a performance of the system;
    selecting, using a second method, a second selection from among the input parameters assigned to the second group, wherein the second method selects the second selection based on a specific probability distribution;
    calculating a characteristic value from the second selection;
    adapting the first selection depending on the characteristic value; and
    performing a verification method with filtering of statistically irrelevant errors.

2. The method as recited in claim 1, wherein the system is embedded in an at least semiautonomous robot or vehicle.

3. The method as recited in claim 1, wherein the input parameters of the first group are subject to boundary conditions; and the input parameters of the second group are subject to limitations.

4. The method as recited in claim 1, further comprising the following step:
    simulating the system based on the first selection and the second selection.

5. The method as recited in claim 4, wherein the simulation encompasses an environment of the system.

6. The method as recited in claim 4, wherein the simulation supplies a performance evaluation of the system.

7. The method as recited in claim 1, wherein the dividing of the input parameters is accomplished manually.

8. The method as recited in claim 1, wherein the first group is smaller than the second group.

9. The method as recited in claim 1, wherein the verification method includes testing or worst-case-oriented methods.

10. The method as recited in claim 1, wherein the statistically irrelevant errors include adversarial examples which occur in a context of machine learning and computer vision.

11. The method as recited in claim 1, wherein an automatic improvement of errors of the system recognized in a test occurs depending on the test.

12. A non-transitory machine-readable memory medium on which is stored a computer program for testing a system, the computer program, when executed by a computer, causing the computer to perform the following steps:
- dividing input parameters of the system into a first group and a second group;
- selecting, using a first method, a first selection from among the input parameters assigned to the first group, wherein the first method includes search-based testing in which an optimization technique is used to select the first selection in which an objective of the optimization technique is to minimize a performance of the system;
- selecting, using a second method, a second selection from among the input parameters assigned to the second group, wherein the second method selects the second selection based on a specific probability distribution;
- calculating a characteristic value from the second selection;
- adapting the first selection depending on the characteristic value; and
- performing a verification method with filtering of statistically irrelevant errors.

13. An apparatus for testing a system, the apparatus configured to:
- divide input parameters of the system into a first group and a second group;
- select, using a first method, a first selection from among the input parameters assigned to the first group, wherein the first method includes search-based testing in which an optimization technique is used to select the first selection in which an objective of the optimization technique is to minimize a performance of the system;
- select, using a second method, a second selection from among the input parameters assigned to the second group, wherein the second method selects the second selection based on a specific probability distribution;
- calculate a characteristic value from the second selection;
- adapt the first selection depending on the characteristic value; and
- perform a verification method with filtering of statistically irrelevant errors.

* * * * *